(12) United States Patent
Makohon et al.

(10) Patent No.: US 9,921,942 B1
(45) Date of Patent: Mar. 20, 2018

(54) SECURITY VALIDATION OF SOFTWARE DELIVERED AS A SERVICE

(71) Applicant: Wells Fargo Bank, N.A., San Francisco, CA (US)

(72) Inventors: Peter A. Makohon, Charlotte, NC (US); Ross Cavanaugh, Harrisburg, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 174 days.

(21) Appl. No.: 14/921,403

(22) Filed: Oct. 23, 2015

(51) Int. Cl.
| | | |
|---|---|---|
| G06F 21/00 | (2013.01) | |
| G06F 11/36 | (2006.01) | |
| G06F 17/30 | (2006.01) | |
| H04L 12/26 | (2006.01) | |
| G06F 21/57 | (2013.01) | |

(52) U.S. Cl.
CPC .... *G06F 11/3612* (2013.01); *G06F 17/30598* (2013.01); *G06F 21/577* (2013.01); *H04L 43/50* (2013.01); *G06F 2221/033* (2013.01)

(58) Field of Classification Search
CPC ........... G06F 11/3612; G06F 17/30598; G06F 21/577; G06F 2221/033; H04L 43/50
See application file for complete search history.

(56) References Cited

U.S. PATENT DOCUMENTS

| | | | |
|---|---|---|---|
| 6,473,794 B1* | 10/2002 | Guheen | H04L 41/22 709/223 |
| 2009/0064337 A1* | 3/2009 | Chien | G06F 21/564 726/25 |
| 2011/0093955 A1* | 4/2011 | Chen | G06F 21/577 726/25 |
| 2012/0042383 A1* | 2/2012 | Greene | G06F 21/57 726/25 |
| 2012/0042384 A1* | 2/2012 | Badhwar | G06F 21/128 726/25 |
| 2015/0007330 A1* | 1/2015 | Gomez | G06F 21/577 726/25 |
| 2017/0098086 A1* | 4/2017 | Hoernecke | G06F 21/577 726/25 |

* cited by examiner

*Primary Examiner* — Mahfuzur Rahman
(74) *Attorney, Agent, or Firm* — Merchant & Gould P.C.

(57) ABSTRACT

An electronic computing device obtains application source code to be tested. The application source code is automatically categorized into one or more hardware or software classifications. One or more tests are identified for the application source code based on the one or more hardware or software classifications. The one or more tests are run against the application source code. The one more tests are monitored as they are running. Based on results from the one or more tests, a test score representing a security risk of the application source code is automatically determined. A summary of the results from the one or more tests, including the test score, is visually displayed on the electronic computing device.

18 Claims, 6 Drawing Sheets

US 9,921,942 B1

SECURITY VALIDATION OF SOFTWARE DELIVERED AS A SERVICE

BACKGROUND

Cloud computing is a type of computing that can provide shared software solutions from remote servers hosted on the Internet. Software as a service (SAAS) is a software licensing and delivery model in which software can be licensed on a subscription basis from a central host on the Internet. Because of improved operational efficiencies and cost savings, cloud computing and SAAS have seen a dramatic increase in use in recent years.

Although cloud computing and SAAS have become popular, cloud computing and SAAS can sometimes have a reputation for being insecure and unsafe. When cloud computing and SAAS are used in a business environment, care needs to be taken to ensure that software obtained and used via cloud computing and SAAS do not compromise the security of other software and data used by the business.

SUMMARY

Embodiments of the disclosure are directed to an electronic computing device comprising: a processing unit; and system memory, the system memory including instructions which, when executed by the processing unit, cause the electronic computing device to: obtain application source code to be tested; automatically categorize the application source code into one or more hardware or software classifications; identify one or more tests for the application source code based on the one or more hardware or software classifications; run the one or more tests against the application source code; monitor the one more tests as they are running; based on results from the one or more tests, automatically determine a test score representing a security risk of the application source code; and visually display a summary of the results from the one or more tests, including the test score, on the electronic computing device.

In another aspect, a method implemented on an electronic computing device for testing source code of a software application to identify security vulnerabilities in the software application comprises: automatically categorizing the application source code into one or more categories of a plurality of available categories for classifying an architecture, a hardware or software platform, software components or an operating system of the application source code; identifying one or more tests for the application source code based on the one category of the application source code; running the one or more tests against the application source code; monitoring the one more tests as they are running; based on results from the one or more tests, automatically determining a test score representing a security risk of the application source code; and visually displaying a summary of the results from the one or more tests, including the test score, on the electronic computing device.

In yet another aspect, an electronic computing device includes a processing unit; and system memory, the system memory including instructions which, when executed by the processing unit, cause the electronic computing device to: obtain application source code to be tested; automatically categorize the application source code into one or more categories of a plurality of available categories for classifying the application source code, the categorization of the application source code into the one or more categories of the plurality of available categories comprising one or more of: automatically identify a specific code platform for the application source code; and automatically identify one or more software components being used on the application source code; identify one or more tests for the application source code based on the one category of the application source code; run the one or more tests against the application source code, the running of the one or more tests against the application source code comprising: test server application source code on the electronic computing device; test client application source code on the electronic computing device; monitor network traffic between the electronic computing device and a server computer; and monitor network traffic between the electronic computing device and a client computer; monitor the one more tests as they are running; based on results from the one or more tests, automatically determine a test score representing a security risk of the application source code; and visually display a summary of the results from the one or more tests, including the test score, on the electronic computing device.

The details of one or more techniques are set forth in the accompanying drawings and the description below. Other features, objects, and advantages of these techniques will be apparent from the description, drawings, and claims.

DETAILED DESCRIPTION

Figure 1:
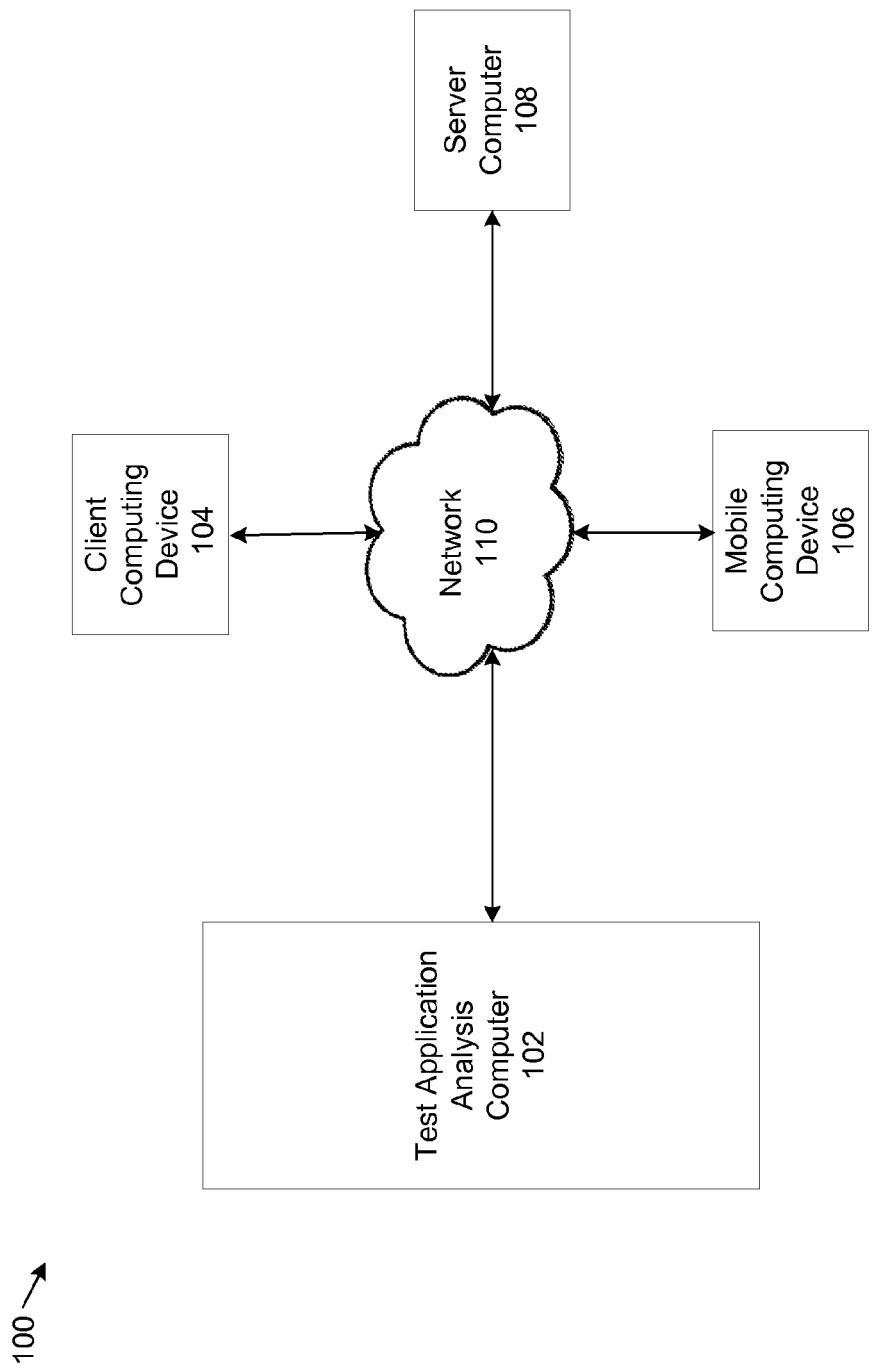
FIG. 1 shows an example system that supports validation of software delivered as a service.

The present disclosure is directed to systems and methods that validate the security and safety of software delivered as a service. The systems and methods can be used to automate an end to end analysis that can take into account three or more primary components—such as a client electronic computing device, a server computer and a network than can connect the client electronic computing device to the server computer.

Examples of the systems and methods provide for obtaining source code of client and server software to be tested, categorizing the software, automatically running tests against the software based on the categorization, automatically analyzing results of the testing and generating a test score that indicates a degree of vulnerability for the software. In addition, automatic triggers can be used to retest a security of an application after software code updates or bug fixes have been applied to the application. Further, the systems and methods provide for automatically monitoring network traffic between client and server to test security of data transmissions.

The software to be tested can be client software that runs in a web browser, an applet that runs in the web browser or other client software that is part of a client/server environment. Server side software can also be tested. The software to be tested can be tested on a custom test application analysis computing device. The source code of the software to be tested can be downloaded to the custom test application analysis device from a client computer or server computer that uses the software. In this disclosure, the source code of the software to be tested is also referred to as application source code.

Custom scripts can be run against the software to be tested on the custom test analysis computing device. Tools and services can be developed to observe the client software as the client software is running and to determine how well the client software is written regarding security vulnerabilities and to determine how well the client software performs. Some example checks run on the client software can include checking whether the client software stores anything on disk, such as user IDs and passwords, that is sensitive, storing anything in memory that can be easily retrieved and determining whether the client software is dependent on other components that that may be at a deficient level of security because the components have not been kept up to date. Other checks are possible.

Before the software is tested, the software is categorized into a particular application architecture. Some tests that can be run for one type of application architecture may not be appropriate for another type of application architecture. For example, if one software application uses an encrypted network protocol and another software application does not use the encrypted network protocol, tests run against the software application that includes encryption can focus on encryption, but tests run against the software application that does not include encryption can skip tests that focus on encryption. As another example, for software applications that use encryption, a specific level or type of encryption can be identified and tests can be directed to the specific level or type of encryption.

The software to be tested can be automatically categorized by mapping the software to profiles of other software applications that have been previously analyzed. The profiles can include characteristics of the software applications such as a type of operating system (OS) used, type and characteristics of software components used, type and characteristics of user interfaces used, operational features of the software, for example whether the software interfaces with a server computer across a network or operates standalone, communication protocols used, if any, sensitivity of information processed and other characteristics. After each new software application is analyzed, the profiles can be updated to incorporate features of the new software application.

The categorization of a software application determines what type of tests are to be run against the software application. Some of the tests can be run on the test application computing device, some tests can be run externally to the test application computing device and some tests can be run over a network. Some tests can be run on a remote device, such as a server computer, that is directed at the test application computing device.

Some of the tests can be an application penetration test that can be implemented on an application programming interface (API) of the software to be tested. The application penetration tests can target the software to be tested, similar to what an attacker could do to determine vulnerabilities in the software to be tested. For example, the tests can send a series of text strings to the software to be tested and monitor how the software to be tested processes the strings.

The systems and methods implement a framework that can not only categorize a software application and implement tests specific to the software application but can also dynamically change tests to be implemented and change testing parameters based on results received. Decision trees can be used to determine which tests to run based on the test results. In this manner, instead of running the same set of tests for each application, the type of tests that are run can be adjusted automatically during operation based on the test results. This permits the tests to be targeted to a specific application environment.

The framework also provides for network traffic to be monitored to determine if any abnormalities can be detected. For example, a higher data volume than expected could indicate a security vulnerability. The framework can also detect signs that information that is being transmitted is not protected adequately or that the software application is susceptible to security vulnerabilities such as injection errors, replay attacks and other security vulnerabilities.

The framework also provides for automated triggers which can automatically initiate testing for software vulnerabilities. For example, when a software application is updated with a new version of software or a software patch, the new version of software or the software patch can cause a security vulnerability. This can be the case even when a software application has been previously tested and found to be free of security vulnerabilities. The automated triggers can detect when the software application is updated or patched and automatically trigger a retest of the software application for security vulnerabilities. The automated triggers can also be used to detect when changes have been made to software components used by the software application. Changes to the software components used by the software application can automatically trigger a retest of the software application for security vulnerabilities.

The framework also provides for a visual representation of test results for both a user and a technical analyst. For the user, the visual representation can include a numerical score representing a risk level of the software and also a general message, describing the risk level of the software. For the technical analyst, the visual representation can be based on a topology of devices being tested and of the network. The visual representation can indicate, using text, color or a combination of text and color any areas of concern, such as issues with memory, storing data, etc. Color can be used to show a topology of components of the software application that may be of high risk. The visualization can show where a faulty component is located, which component is causing the most risk, and at which point in the execution of the software application a software vulnerability can occur. Other aspects of visualization are possible.

The systems and methods disclosed herein are directed to a computer technology that solves an existing problem in detecting security vulnerabilities in software applications. The systems and methods improve efficiencies of testing software applications because the software applications are analyzed and categorized before testing. The categorization of the software applications permits tests to be run that are specifically directed to the software application, as opposed to inefficiently running a battery of tests, some of which may not be relevant to the software application to be tested. Additional efficiencies can be obtained by using decision trees to determine appropriate tests to be run based on test results. This permits an automatic customization of testing that can improve the speed of the testing and can minimize the use of unnecessary tests.

FIG. 1 shows an example system 100 that supports security validation of software delivered as a service. System 100 includes a test application analysis computer 102, client computing device 104, mobile computing device 106, server computer 108 and network 110. More, fewer or different components can be used.

The example test application analysis computer 102 is an electronic computing device such as a desktop computer or laptop computer that can be used to test and validate the software. The software to be tested can be software applications that can run on a client computer or a server computer over a network such as the Internet. Examples of such software can include client software that can run on mobile devices such as smartphones and tablet computers, client software that can run in web browsers, applets, a cloud computing software service running on a server computer and other similar software.

Source code for software to be tested on test application analysis computer 102 can be downloaded from an appropriate electronic computing device and loaded onto test application analysis computer 102. The software can be statically tested on test application analysis computer 102 using one or more tests applicable for the architecture of the software to be tested. The software can also be dynamically tested on test application analysis computer 102 by simulating the software on test application analysis computer 102 and by accessing one or more of client computing device 104, mobile computing device 106 and server computer 108 over network 110.

The example client computing device 104 is a desktop computer or laptop computer than can have a cloud software service loaded onto it. For example the cloud software service can be an applet downloaded from a server computer, such as server computer 108, or other software than can run on a software application, such as a web browser, on client computing device 104.

The example mobile computing device 106 is a smartphone or tablet computer that can have a cloud software service loaded onto it. As for client computing device 104, the cloud software service for mobile computing device 106 can be an applet downloaded from a server computer, such as server computer 108 or other software than can run on a software application, such as a web browser, on mobile computing device 106.

The example server computer 108 is a server computer from which cloud services such as software as a service can be accessed. In some implementations, server computer 108 can also be a web server. A user on client computing device 104 or on mobile computing device 106 can access the cloud services over network 110.

The example network 110 is computer network that can permit communication between one or more of test application analysis computer 102, client computing device 104, mobile computing device 106 and server computer 108. Network 110 can comprise a corporate Intranet and network 110 can also include the Internet.

Figure 2:
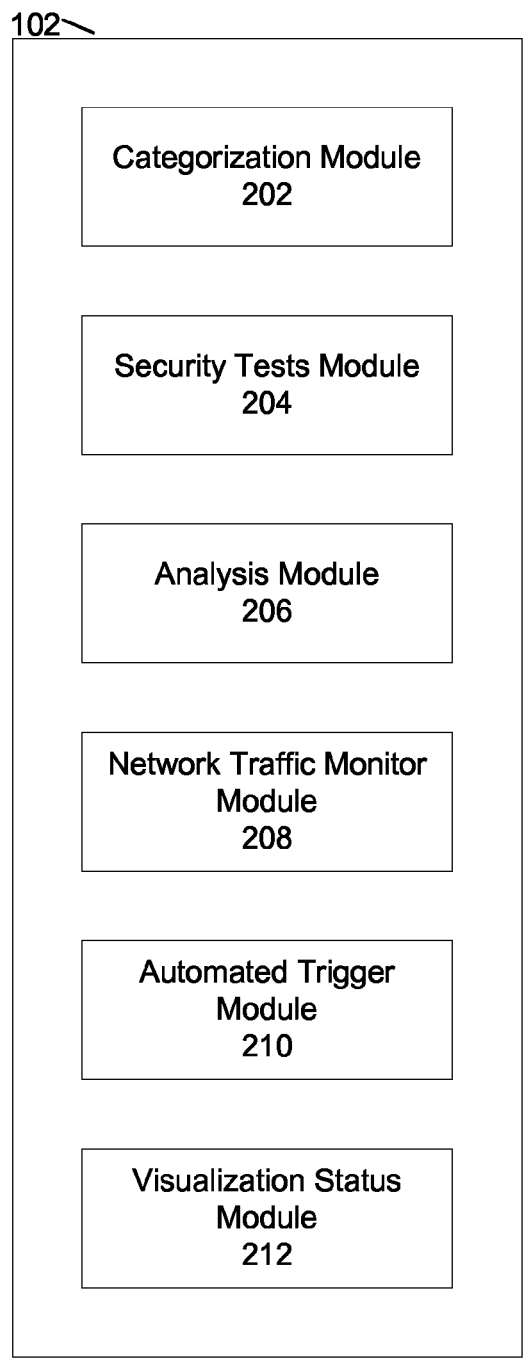
FIG. 2 shows example modules of the test application analysis computer of FIG. 1.

FIG. 2 shows example modules of test application analysis computer 102. The example modules include a categorization module 202, a security tests module 204, an analysis module 206, a network traffic monitor module 208, an automated trigger module 210 and a visualization status module 212.

The example categorization module 202 parses the source code of the software to be tested and automatically classifies the software into one of a plurality of categories. The classification can be based on one or more criteria. In one example implementation, the classification can be based on a platform level of the software. For example, one classification can be for software that runs on an Apple IOS device. Another classification can be for software that runs on an Android OS. A third classification can be for software that runs on both Apple IOS and Android OS. In another implementation, the classification can be based on software components that are being used. For example, a classification can be for a component that supports the Java programming language. Other classification can be for a component that supports Web Sphere or Active Server Pages (ASP). More than one classification can be used. Other classifications can be used including a type of architecture used by the software. Some example software architectures can include client-server, component based, data centric, event driven, rule based, service oriented, plug-ins, layered and peer-to-peer. More, fewer or different computer architectures can be used.

The example security tests module 204 includes a plurality of tests that can be run on the software to be tested. Tests are called to be run based on the classification(s) for the software to be tested. The classification(s) are identified by the categorization module 202. The tests that are called to be run can be in the form of executable scripts which can call specific routines in the security tests module 204. The tests can be static in nature, testing the software in isolation on the test application analysis computer 102 or the tests can be dynamic in nature, implementing functionality not only in the software to be tested but also in one or more of client computing device 104, mobile computing device 106 and server computer 108. Example tests can include determining whether sensitive material, such as user IDs, passwords, personal information, etc. is being accessed by the software, checking memory operations for the software, checking disk storage operation and passing one or more data strings through the software. Other tests are possible.

The example analysis module 206 analyzes results from the tests run by the security tests module 204. The analysis module 206 contains rules that can determine whether a result of a test operation is an acceptable result or whether the result signifies a possible security vulnerability. The analysis module 206 compiles the results and calculates a numerical score that represents a risk level and a degree of security vulnerability for the software that is tested. In an example implementation, a cumulative score can be calculated on a scale of zero to hundred, where zero represents completely unsecure software and one hundred represents a lowest degree of security vulnerability.

The example network traffic monitor module 208 monitors a level of traffic between the test application analysis computer 102 and one or more of the client computing device 104, mobile computing device 106 and server computer 108. The network traffic monitor module 208 can implement watches that monitor data flow into and out of the test application analysis computer 102. For example, the traffic can be monitored during an automated penetration test in which messages and data are transmitted and received between test application analysis computer 102 and one or more of the client computing device 104, mobile computing device 106 and server computer 108. Some of the traffic can be initiated from test application analysis computer 102 and some of the traffic can be initiated from one or more of client computing device 104, mobile computing device 106 and server computer 108. The traffic being monitored is transmitted or received at test application analysis computer 102 and transmitted or received over network 110. In an example implementation, the network traffic monitor module 208 can determine a size of messages and data being transmitted from and received by test application analysis computer 102 and use time stamps of a start and stop of a transmission of messages and data and a start and stop of a reception of messages and data to determine a level of network 110 traffic as a result of communications to and from test application analysis computer 102.

The example automated trigger module 210 automatically determines when to run security tests against the software to be tested. The automated trigger module 210 stores version levels of the software to be tested. Each time a new version level is detected for the software to be tested, for example from a software update to the software to be tested, the automated trigger module 210 initiates the security tests. In addition, the example automated trigger module 210 can monitor version levels of software components that can be accessed by the software to be tested. The software components than can be monitored can reside on test application analysis computer 102 or the software components can reside on other electronic computing devices located across network 110.

In some implementations, a notification can be received at test application analysis computer 102 that one or more of the software components have been updated and that a version level has changed for these software components. Each time a determination is made that a version level has changed on one of these software components, the security tests can be executed on the software to be tested. The security tests can be executed on the software to be tested because it is possible that a change in one of the software component can cause a vulnerability in the software to be tested. This is because data that may have been handled properly in a software component before the software component was updated may now cause a security vulnerability after the software component has been updated.

The example visualization status module 212 provides a visual representation of component modules in the software that is being tested and provides a visual status for one or more of the component modules. The component modules can be an abstraction of various levels of granularity of functional blocks of the software being tested. The visual status can be a color that represents a security risk for the component modules, the visual status can be a message or a graphic that indicates the security risk for the software component or the visual status can be a combination of a color, message and graphic. The visual status of the component modules can be an aid to a tester of the software when trying to identify faulty components in the software being tested.

The visualization status module 212 can also provide an overall security status of the software being tested. The overall status can be in the form of a message, a popup window showing status, a graphic indicating status or any combination of a message a popup window, a graphic or similar type of notification mechanism.

The visualization status module 212 can also display a version level for the software being tested and for software components accessed by the software to be tested. The version level can be displayed in a color that represents a security risk of the version of the software being tested. For example, if a number of open vulnerabilities for the version of the software being tested is greater than a predetermined threshold, the version level can be displayed in red, indicating a degree of caution for the version of the software being tested. As another example, if a software component accessed by the software to be tested has a version number indicating that the software component is out of date, the visualization status module 212 can display the software component in a color that indicates caution, such as yellow, can display the version level of the software component in red and can display a visual status message. Other examples are possible.

Figure 3:
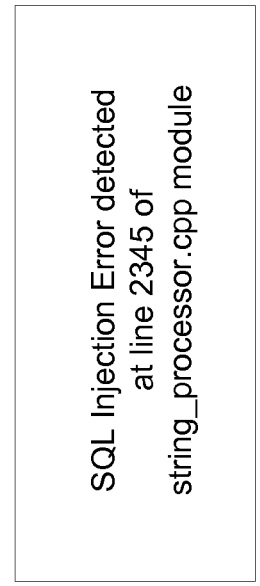
FIG. 3 an example display message that can be generated by the visualization status module of FIG. 2.

FIG. 3 shows an example display message 300 that can be generated by the visualization status module 212. The example display message 300 is displayed when an error is detected as a result of one of the security tests performed on the software being tested. The display message 300 indicates that a SQL Injection Error was detected at line 2345 of a string_processorl.cpp module for the software being tested. A tester can view display message 300 and provide information regarding the display message 300 to the supplier of the software being tested. The example display message 300 can help software developer's determine where possible weaknesses can be found in the software being tested. As discussed above, herein, other types of status visualizations are possible.

Figure 4:
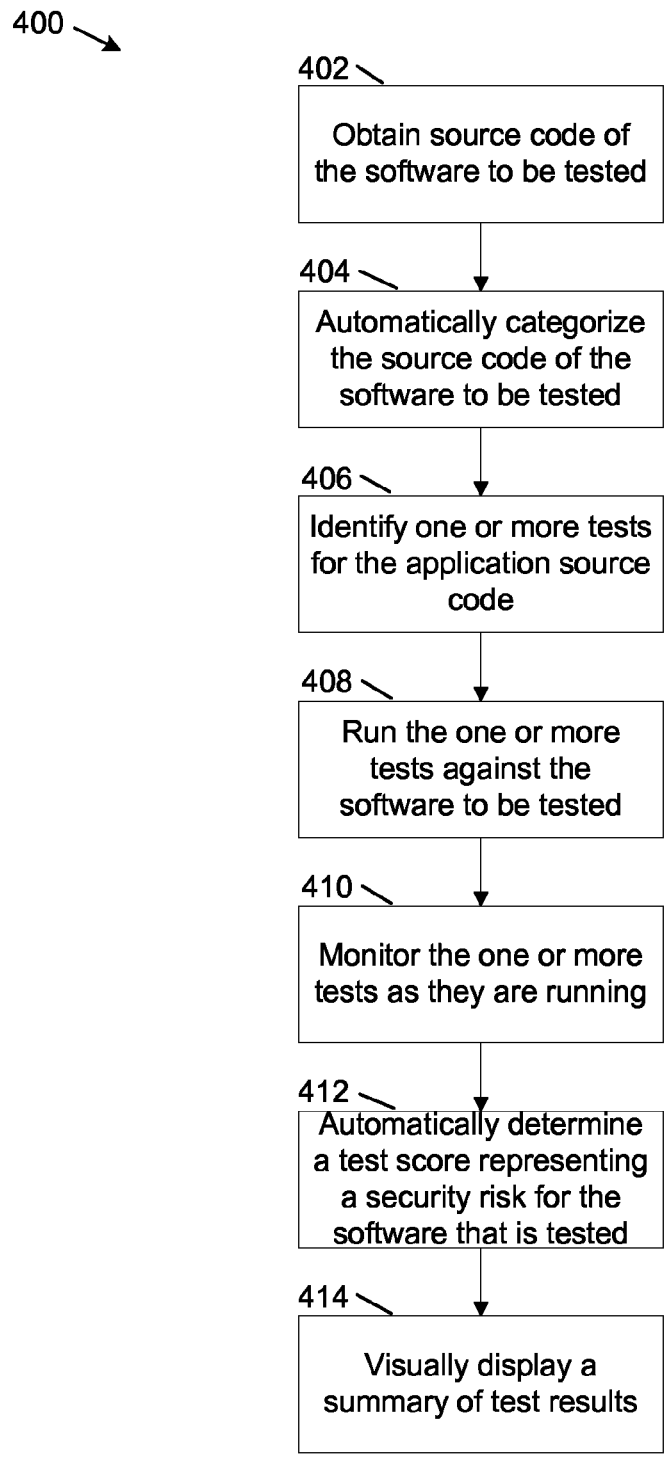
FIG. 4 shows a flowchart of an example method for validating software to be delivered as a service.

FIG. 4 shows a flowchart of an example method 400 for security validation of software delivered as a service. As used in this method, software delivered as a service (SAAS) is a cloud-based software and delivery model in which software can be licensed on a subscription basis from a central host on the Internet. Examples of SAAS can include word processing software, payroll processing software, database management software, game software, development software, customer relationship management (CRM) software, enterprise resource planning (ERP) software and management information systems (MIS) software. Other examples are possible.

At operation 402, source code for the software to be tested is obtained. The source code can be downloaded or otherwise obtained from a company that developed the software. The company may be willing to provide the source code as a way to validate the software on a business network and make it more likely that the software will be purchased once validated.

At operation 404, the software to be tested is automatically categorized into one or more of a plurality of categories. The categories can be based on such items as an operating system that the software runs on, the software components used, a type of software architecture used, use cases for the software (for example, using a TCP/IP protocol to communicate over a network) and other categories.

At operation 406, one or more tests are identified to be run against the software. The tests that are run are based on the one or more categories of the software identified at operation 304. Some example tests that can be run include memory tests, tests that detect whether the software processes or stores sensitive information, string processing tests, data processing tests, tests of a network protocol used by the software, input/output processing tests and tests related to transmitting and receiving messages and data to and from other electronic computing devices, such as client computers, mobile computing devices and server computers across a network. Additional tests can be used.

At operation 408, the one or more tests identified at operation 406 are executed in the software to be tested. As part of the testing process, the test application analysis computer 102 can test individual components in the software to be tested. The test application analysis computer 102 can also initiate operations between the software to be tested and the other electronic computing devices across the network.

At operation 410, the test application analysis computer 102 monitors the one or more tests from operation 408 as the tests are running. The test application analysis computer 102 can analyze results from static tests to determine, for example, if the software to be tested properly processes strings or sensitive information. The test application analysis computer can also monitor and analyze results from dynamic tests such as operating the software to be tested across a network. Network traffic can be monitored to identify problems that can be associated with data transmission, memory can be monitored for leaks, and strings can be monitored to determine whether sensitive data is being processed properly.

At operation 412, a test score is automatically determined for the software to be tested. The test score represents a security risk for the software to be tested. In an example implementation, the test score can be a numerical value from zero to 100, where zero represents maximum security risk and 100 represents minimum security risk. The test application analysis computer 102 can process the analyzed test results from operation 410, compare the test results with results that can be expected from minimal risk software and automatically determine where the test results fit in a range of test scores. In one example implementation, a numerical value can be assigned to each test based on an analysis of the tests results for each test. The numerical values for each test can be averaged and mapped to a table that assigns an overall test score based on the averaged numerical values. In another example implementation, points can be deducted for each test in which security vulnerabilities can be detected. The number of points that can be deducted can be based on a severity of the security vulnerability. A total number of points that are deducted for the one or more tests can be calculated and this total number of points can be automatically mapped against a range of test scores for the one or more tests being conducted. An overall security risk score can be obtained by obtaining a test score from the mapping that corresponds to the total number of points deducted. Other methods of determining a security risk score are possible.

At operation 414, a summary of test results is displayed on a display screen of the test application analysis computer 102. The summary of test results can include an overall security risk score for the software that is tested. The overall risk score indicates a degree to which the software is vulnerable to security risks. The summary of test results can also include a graphic showing individual components in the software that is tested. The graphic can be color coded to indicate a degree of security. Text can also be included in the graphic to specifically point out security risks. Other graphic visualizations of the test results are possible.

Figure 5:
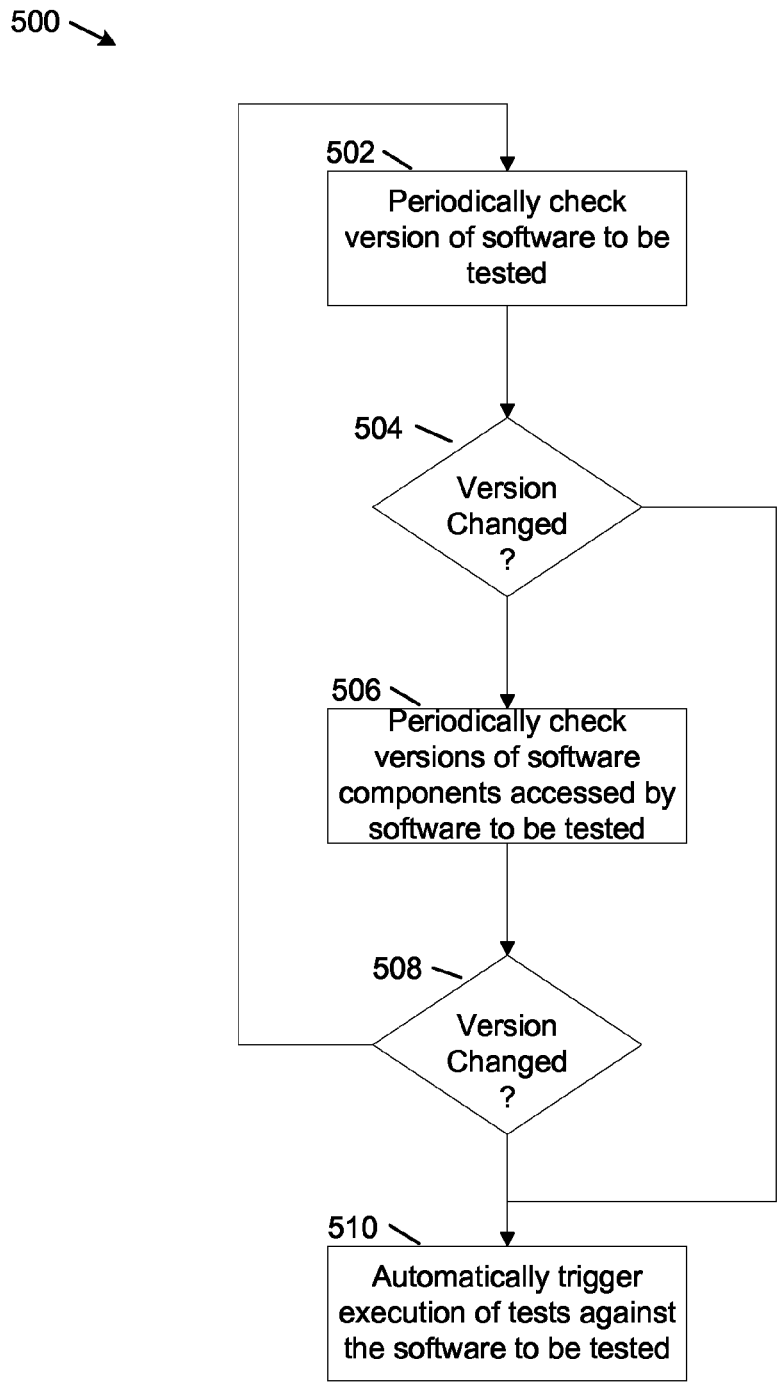
FIG. 5 shows a flowchart of an example method for automatically triggering execution of security tests.

FIG. 5 shows a flowchart of an example method 500 for automatically triggering execution of security tests on a software application to be tested based on code patches or updates. The code patches or updates can be for the software application to be tested or for software components accessible by the test application analysis computer 102. The execution of the security tests on the software application to be tested is to verify that the code patches or updates have not introduced security flaws into the software application to be tested.

At operation 502, a version level of the software application to be tested is periodically obtained. In some implementations, the version level of the software application to be tested is checked each time the software application to be tested is downloaded to test application analysis computer 102. In some implementations, the version level is checked when a notification is received at test application analysis computer 102 to check the version level. The notification can be in the form of a message sent from a server computer or other electronic computing device on which the software application to be tested is used.

At operation 504, a check is made as to whether the version level of the software to be tested has changed. At operation 504, when a determination is made that the version level of the software to be tested has changed, control advances to operation 510 where tests against the software to be tested are automatically executed.

At operation 504, when a determination is made that the version level of the software to be tested has not changed, at operation 506, version levels of software components accessed by the software to be tested are periodically checked. When the software components accessed to be tested reside on the test application analysis computer 102, the version levels of the software components can be obtained directly from the software components. In some implementations, when the software components reside on a computing device external to the test application analysis computer 102, a notification can be received when a software component that is accessed by the software application to be tested has been updated.

At operation 508, a check is made as to whether version levels of software components accessed by the software to be tested have changed. At operation 508, when a determination is made that a version level of a software component accessed by the software to be tested has changed, at operation 510 tests are automatically executed against the software to be tested. A detection of the version level change for the software component that is accessed by the software to be tested generates an automatic trigger to perform execution of tests against the software to be tested.

Figure 6:
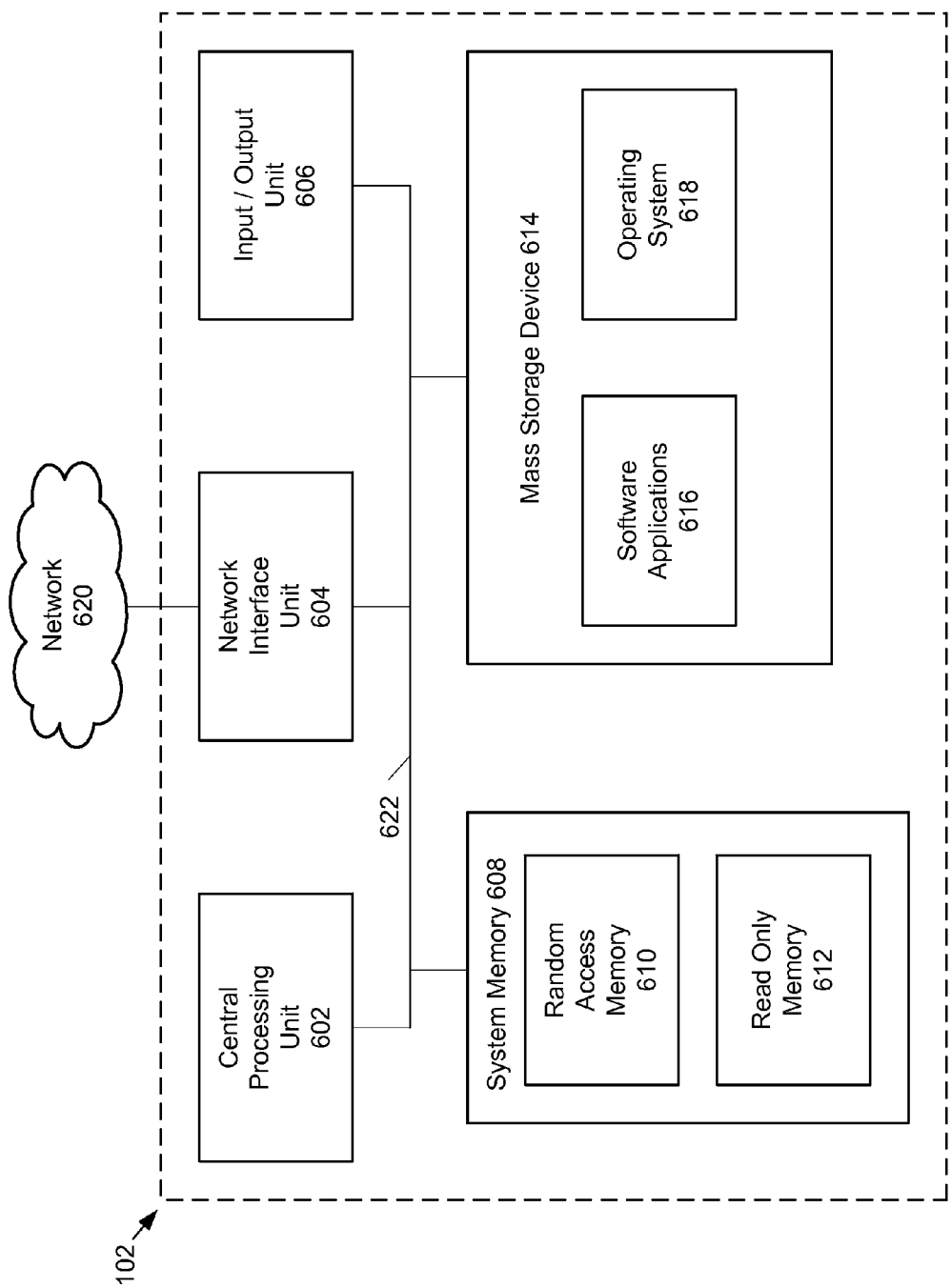
FIG. 6 shows example physical components of the server computer of FIG. 1.

As illustrated in the example of FIG. 6, test application analysis computer 102 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the test application analysis computer 102, such as during startup, is stored in the ROM 612. The test application analysis computer 102 further includes a mass storage device 614. The mass storage device 614 is able to store software instructions and data. Some or all of the components of the test application analysis computer 102 can also be included in client computing device 104, mobile computing device 106 and server computer 108.

The mass storage device 614 is connected to the CPU 602 through a mass storage controller (not shown) connected to the system bus 622. The mass storage device 614 and its associated computer-readable data storage media provide non-volatile, non-transitory storage for the test application analysis computer 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the test application analysis computer 102.

According to various embodiments of the invention, the test application analysis computer 102 may operate in a networked environment using logical connections to remote network devices through the network 620, such as a wireless network, the Internet, or another type of network. The test application analysis computer 102 may connect to the network 620 through a network interface unit 604 connected to the system bus 622. It should be appreciated that the network interface unit 604 may also be utilized to connect to other types of networks and remote computing systems. The test application analysis computer 102 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the test application analysis computer 102 can store software instructions and data. The software instructions include an operating system 618 suitable for controlling the operation of the test application analysis computer 102. The mass storage device 614 and/or the RAM 610 also store software instructions, that when executed by the CPU 602, cause the test application analysis computer 102 to provide the functionality of the test application analysis computer 102 discussed in this document. For example, the mass storage device 614 and/or the RAM 610 can store software instructions that, when executed by the CPU 602, cause the test application analysis computer 102 to display received data on the display screen of the test application analysis computer 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device comprising:
    a processing unit; and
    system memory, the system memory including instructions which, when executed by the processing unit, cause the first electronic computing device to:
    obtain application source code to be tested;
    automatically categorize the application source code into one or more hardware or software classifications, comprising: identify a specific code platform for the application source code;
    identify one or more tests for the application source code based on the one or more hardware or software classifications for running against the specific platform;
    run the one or more tests against the application source code;
    monitor the one more tests as they are running;
    based on results from the one or more tests, automatically determine a test score representing a security risk of the application source code; and
    visually display a summary of the results from the one or more tests, including the test score, on the electronic computing device.

2. The electronic computing device of claim 1, wherein run the one or more tests against the application source code comprises:
    monitor network traffic between the electronic computing device and a server computer; and
    monitor network traffic between the electronic computing device and a client computer.

3. The electronic computing device of claim 1, wherein the one or more tests comprises determining whether one or more files write data in one or more specific directories.

4. The electronic computing device of claim 1, wherein the one or more tests comprises determining whether one or more specific modules are called during the running of the one or more tests.

5. The electronic computing device of claim 1, wherein automatically categorize the application source code into one or more hardware or software classifications comprises:
    automatically identify one or more software components being used on the application source code; and
    identify one or more tests for running against the one or more software components.

6. The electronic computing device of claim 1, wherein the application source code is categorized by mapping the application source code against a set of profiles of characteristics of other software applications that have been analyzed.

7. The electronic computing device of claim 1, wherein the application source code includes one or more of client side code or server side code.

8. The electronic computing device of claim 1, further comprising:
    analyzing the test results; and
    determining one or more additional tests to be run based on the test results.

9. The electronic computing device of claim 1, further comprising:
    monitor updates to the application source code; and
    automatically initiate the one or more tests when an update to the application source code is detected.

10. The electronic computing device of claim 1, wherein automatically determine a test score further comprises:
    automatically classify the results from the one or more tests into a predetermined number of categories;
    assign a numerical score to each result based on the category to which the result has been classified; and
    calculate a cumulative score for the results.

11. The electronic computing device of claim 1, wherein visually display the results from the one or more tests comprises:
    display a graphic of one or more software components of the application source code; and
    use a color for one or more of the software components to display a degree of risk for the one or more of the software components.

12. A method implemented on an electronic computing device for testing source code of a software application to identify security vulnerabilities in the software application, the method comprising:
    on the electronic computing device, automatically categorizing the application source code into one or more categories of a plurality of available categories for classifying an architecture, a hardware or software platform, software components or an operating system of the application source code;
    identifying one or more tests for the application source code based on the one category of the application source code;

running the one or more tests against the application source code on the hardware or software platform;

monitoring the one more tests as they are running;

based on results from the one or more tests, automatically determining a test score representing a security risk of the application source code;

visually displaying a summary of the results from the one or more tests, including the test score, on the electronic computing device; and mapping one or more of the results of the one or more tests against a set of profiles, the profiles based on past results of running the one or more tests.

13. The method of claim 12, wherein automatically, categorizing the application source code into one or more categories of a plurality of available categories comprises:

automatically identifying a specific platform for the application source code; and identifying one or more tests for running against the specific platform.

14. The method of claim 13, wherein the platform is one of Apple IOS or Android.

15. The method of claim 12, wherein automatically, categorizing the application source code into one or more categories of a plurality of available categories comprises:

automatically identifying one or more software components being used on the application source code; and identifying one or more tests for running against the one or more software components.

16. The method of claim 12, wherein visually displaying the results from the one or more tests comprises:

displaying a graphic of one or more software modules of the test application code; and using a color for one or more of the software modules to display a degree of risk for the one or more of the software modules.

17. The method of claim 12, wherein visually displaying the results from the one or more tests comprises displaying a message or a graphic indicating a location in the application source code at which a security vulnerability is detected.

18. An electronic computing device comprising:

a processing unit; and system memory, the system memory including instructions which, when executed by the processing unit, cause the electronic computing device to:

obtain application source code to be tested;

automatically categorize the application source code into one or more categories of a plurality of available categories for classifying the application source code, the categorization of the application source code into the one or more categories of the plurality of available categories comprising one or more of:

automatically identify a specific code platform for the application source code; and automatically identify one or more software components being used on the application source code;

identify one or more tests for the application source code based on the one category of the application source code for running against the specific code platform;

run the one or more tests against the application source code, the running of the one or more tests against the application source code comprising:

test server application source code on the electronic computing device;

test client application source code on the electronic computing device;

monitor network traffic between the electronic computing device and a server computer; and monitor network traffic between the electronic computing device and a client computer;

monitor the one more tests as they are running;

based on results from the one or more tests, automatically determine a test score representing a security risk of the application source code; and visually display a summary of the results from the one or more tests, including the test score, on the electronic computing device.

* * * * *